(12) United States Patent
Bamberg et al.

(10) Patent No.: US 7,533,036 B2
(45) Date of Patent: May 12, 2009

(54) METHOD AND SYSTEM FOR PREPARING A NEW STORE FOR OPENING AND OPERATION

(75) Inventors: Stephen Bamberg, Bartlett, IL (US);
Jeffrey A. Rein, Lincolnshire, IL (US);
Denise K. Wong, Hinsdale, IL (US);
William J. Wilson, Libertyville, IL (US); Stephen O. Schilder, Mundelein, IL (US); Dana M. Hembd, Lake Zurich, IL (US); Joseph P. Tiemeyer, Highland Park, IL (US); John Merritello, Jr., Addison, IL (US); John W. Gleeson, Chicago, IL (US)

(73) Assignee: Walgreen Co., Deerfield, IL (US)

( * ) Notice: Subject to any disclaimer, the term of this patent is extended or adjusted under 35 U.S.C. 154(b) by 1032 days.

(21) Appl. No.: 10/174,314

(22) Filed: Jun. 18, 2002

(65) Prior Publication Data

US 2003/0233271 A1 Dec. 18, 2003

(51) Int. Cl.
*G06F 17/30* (2006.01)
*G06F 17/40* (2006.01)
(52) U.S. Cl. .............................. 705/10; 705/22; 705/28; 700/236
(58) Field of Classification Search .................... 705/10
See application file for complete search history.

(56) References Cited

U.S. PATENT DOCUMENTS

| | | | |
|---|---|---|---|
| 5,128,861 A | 7/1992 | Kagami et al. |
| 5,168,445 A | 12/1992 | Kawashima et al. |
| 5,459,656 A | 10/1995 | Fields et al. |
| 5,615,109 A | 3/1997 | Eder |
| 5,765,143 A | 6/1998 | Sheldon et al. |
| 5,930,763 A | 7/1999 | Kaneko et al. |
| 5,963,919 A | 10/1999 | Brinkley et al. |
| 5,974,395 A | 10/1999 | Bellini et al. |
| 5,983,202 A | 11/1999 | Yabe et al. |

(Continued)

FOREIGN PATENT DOCUMENTS

JP        10240799 A    *    9/1998

(Continued)

OTHER PUBLICATIONS

Ghosh & Craig, Formulating Retail Location Strategy in a Changing Environment, Journal of Marketing, vol. 47 (Summer 1983), 56-68.*

(Continued)

*Primary Examiner*—Beth V Boswell
*Assistant Examiner*—Justin M Pats
(74) *Attorney, Agent, or Firm*—Marshall, Gerstein & Borun LLP; Francis C. Kowalik

(57) ABSTRACT

A method and a system for preparing a new store for opening and operation are described herein. The system includes a plurality of network elements and a host computer operatively coupled to the plurality of network elements. The host computer includes a processor and a storage device operatively coupled to the processor. The storage device including information associated with a plurality of virtual stores based on information associated with at least one existing store. One of the plurality of virtual stores corresponds to the new store, and the information associated with the one of the plurality of virtual stores includes information associated with opening and operation of the new store.

21 Claims, 2 Drawing Sheets

U.S. PATENT DOCUMENTS 6,249,774 B1 6/2001 Roden et al.
2003/0028419 A1* 2/2003 Monaghan ................... 705/10

OTHER PUBLICATIONS

Gudrais, After 12 Years, Barsamian's Say Goodbye, Oct. 6, 1999, The Harvard Crimson, http://web.archive.org/web/20051129035750/http://www.thecrimson.com/article.aspx?ref=97666 (last visited Jan. 4, 2007).*

Clarkson et al., UK supermarket location assessment, Int. J. Retail & Distrib. Mgmt., vol. 24, No. 6, 1996, p. 22-23.*

Clarke and Rowley, A case for spatial decision-support systems in retail location planning, Int. J. Retail & Distrib. Mgmt., vol. 23, No. 3, 1995, p. 4-10.*

O'Malley et al., Retailer use of Demographic and other data sources: an empirical investigation, Int. J. Retail & Distrib. Mgmt., vol. 25, No. 6, 1997, p. 188-96.*

Meagher, Walgreen Co.—Demographics prescribe a healthy future for drug chain, Investment News and Views, Barron's National Business and Financial Weekly, Feb. 26, 1990, vol. 70, No. 9, p. 47-48.*

Taneja, Technology Moves In—Retailers have new tools to find the best store locations, Chain Store Age; May 1999, vol. 75, No. 5, p. 136-37.*

Retail Technologies, QuickSell HQ, Apr. 9, 2001.*

FMG, QuickSell Headquarters Features, http://www.fmgpos.com/html/hq.html.*

K. Commerce System, Why Quicksell?, http://www.businesspos.com/ext_firt.htm.*

PR Newswire, QuickSell HeadQuarters Hits Goals of World-Class Soccer Team, Dec. 20, 1999.*

PR Newswire, 'QuickSell HQ' Cuts Cell Phone Giant's P.O.S. Acquisition/Installation Costs; 'Data Flows Easily Between SAP R/3 and HQ', May 6, 1998.*

10-K SEC Filing, Old America Stores, Inc., May 12, 1997, p. 1-12, http://sec.edgar-online.com/1997/05/12/00/0000930661-97-001192/Section2.asp.*

Capture.Net Technologies, Retail Management System, Nov. 12, 2001, retrieved from web.archive.org Apr. 12, 2008, http://web.archive.org/web/20011126004257/http://capture.net/solutions/inv_mgmt.asp.*

Watson, Availablilty is boosted by United's web planogram, The Grocer, May 4, 2002, p. 2 (online reprint p. 19-20).*

FMG, QuickSell Headquarters Features, http://www.fmgpos.com/html/hq.html (see PTO-892, Apr. 22, 2008, p. 1, ref. V, no ascertainable date of publication).*

K. Commerce Systems, Why Quicksell?, http://www.businesspos.com/ext_firt.htm (see PTO-892, Apr. 22, 2008, p. 1, rev. W, no ascertainable date of publication).*

Arnold et al., "Wal-Mart in Europe: Prospects for the UK," International Marketing Review, vol. 17, No. 4/5, 2000, pp. 416-432.

Ketzenberg et al., "Inventory Policy for Dense Retail Outlets," Journal of Operations Management, 18 (2000) 303-316.

Babb et al., "Supermarket University: Instruction Manual for Supermarket Chain Simulator," Apr. 1997.

"Microsoft to Deliver Integrated Retail Managment Solution for Small and Midmarket Retailers: Acquistion of Sales Management Systems' Industry-Leading POS Technology Reinforces Committment to Provide Comprehensive, Connected Retail Solutions for SMB Market," Microsoft Corporation, 2008, http://www.microsoft.com/presspass/press/2002/may02/05—19 quicksellpr.mspx?pf=true, Jul. 1, 2008.

* cited by examiner

METHOD AND SYSTEM FOR PREPARING A NEW STORE FOR OPENING AND OPERATION

TECHNICAL FIELD

This application relates generally to retail and wholesale establishments and, more particularly to a method and a system for preparing a new store for opening and operation.

BACKGROUND

The process for opening a new store or location of a retail and/or wholesale establishment requires a variety of tasks to be completed. Such tasks include determining opening inventory, ordering inventory and inventory transfers from other existing stores of the establishment, establishing vendor and marketing relationships, determining price for items, printing shelf tags, and ordering store and sales signs. Typically, such tasks need to be completed within a short period of time to minimize cost. Thus, computers have been used to help prepare for the opening and operation of a new store.

In a new store staging facility, data is entered and/or transferred to new store computers for opening and operation of new stores. Each new store computer within the new store staging facility corresponds to a new store. For example, a new store computer may include data associated with existing store(s) proximate to the location of its corresponding new store. In particular, inventory, pricing, and sales information for existing store(s) proximate to the location of the new store may be entered into the new store computer corresponding to the new store to determine inventory and pricing for the new store. After the new store computer has been downloaded with information for opening and operation, the computer is shipped to the location of the new store.

Ideally, each new store computer includes the most current data of existing store(s) proximate to the location of the corresponding new store to determine opening inventory and pricing more accurately. However, space limitation in the new store staging facility mandates that the new store computers are downloaded with data and shipped out to the corresponding new stores immediately to make room for other new store computers. Also, the new store computers may not be updated after leaving the new store staging facility and during transit to the corresponding new stores. That is, the new store computers may include data from the initial download only when the new stores may need the promotional and/or seasonal information for opening and operation. Further, the new store computers may not be easily accessible because of the location of the new store staging facility and/or the location of the new store. For example, the location of the new store may not be proximate to the location of the new store staging facility. Thus, personnel from different departments and/or existing stores may not be able to access the new store computers and assist with the process of preparing new stores for opening and operation.

More importantly, new store computers may not have enough sales data to determine potential sales and to order inventory accurately for corresponding new stores. For example, a new store computer may not have sales data of product from the past quarter to assess potential sales of the product at a corresponding new store. Thus, during the early months of the new store, a surplus or a shortage may occur for any given item.

Therefore, a need exists for improving the effectiveness and efficiency of the process for opening and operation of a new store.

DETAILED DESCRIPTION

A method and a system for preparing a new store for opening and operation are described. The system may include a plurality of network elements and a host computer operatively coupled to the plurality of network elements. In particular, the plurality of network elements may be, but is not limited to, a network server, a computer associated with an existing store, a computer associated with a new store, a printer, and an access computer. For example, one of the plurality of network elements may be a computer associated with a new store that is operable to receive information associated with opening and operation of the new store from the host computer. The host computer includes a processor and a storage device operatively coupled to the processor. The storage device includes information associated with a plurality of virtual stores based on information associated with at least one existing store. For example, the storage device may be, but is not limited to, a hard disk, a floppy disk, a memory card, a memory stick, a compact disc, a digital versatile disc, a magnetic memory, a read only memory, an erasable programmable read only memory, a random access memory, a magnetic memory, and an optical memory. One of the plurality of virtual stores corresponds to the new store. Accordingly, the information associated with the one of the plurality of virtual stores includes information associated with opening and operation of the new store. The information associated with opening and operation of the new store may be information associated with, but not limited to, opening inventory, item pricing, shelf price tag, sales prediction, vendor relationship, marketing relationship, and promotional order. Based on information associated with at least one representative, existing store (e.g., a store being geographically proximate to the new store or a store being demographically proximate to the new store), the host computer may generate the information associated with opening and operation of the new store. For example, the host computer may generate information associated with potential sales of the new store based on information associated with sales of at least one existing store to avoid a surplus or a shortage of inventory, i.e., potential sales of the new store may be within a predetermined percentage of sales of an existing store. To further avoid excess inventory, the information associated with opening and operation of the new store may be based on information associated with a transfer of inventory from an existing store to help stock the new store. Thus, information associated with opening and operation of the new store is available prior to the actual opening of the new store.

Figure 1:
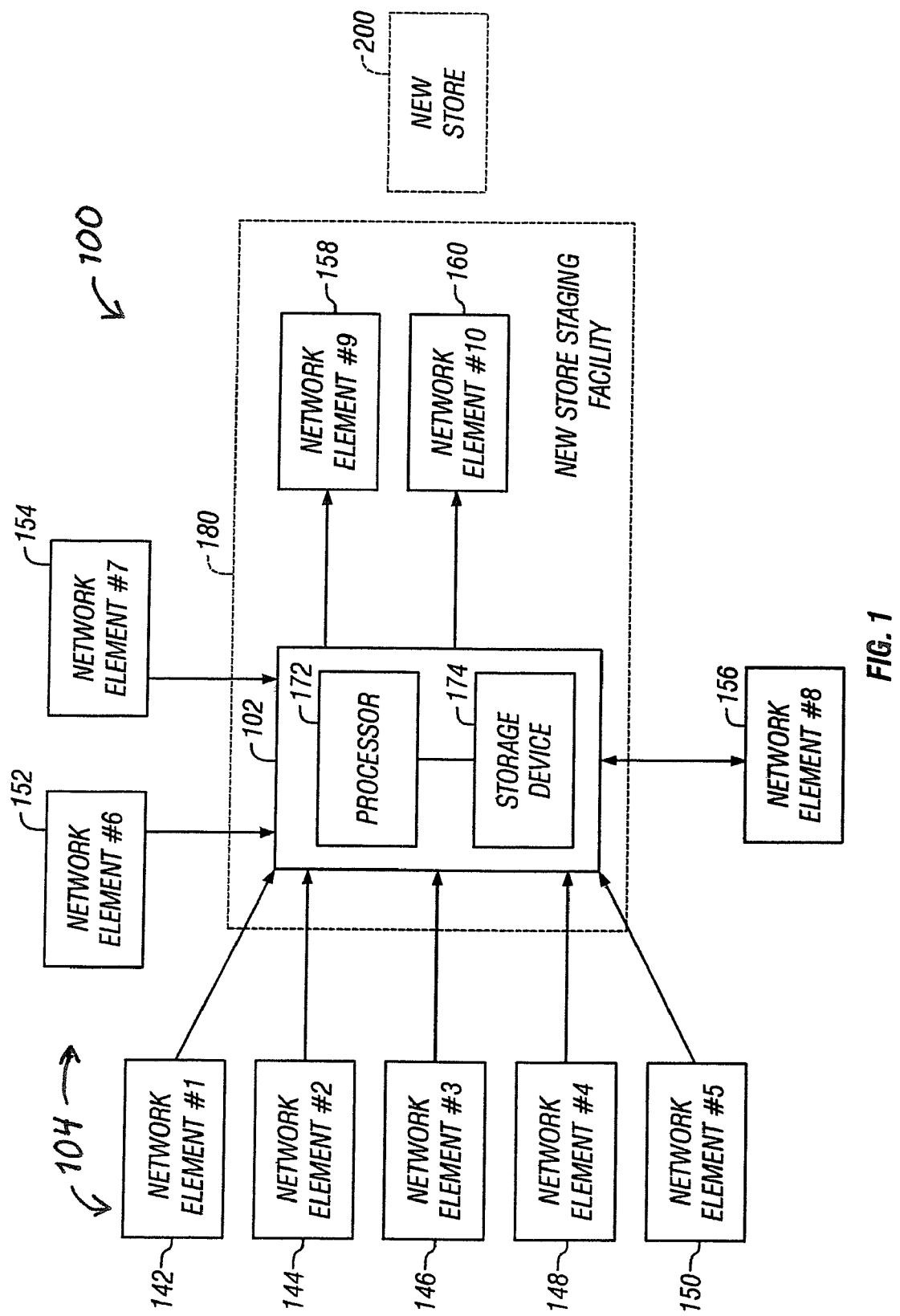
FIGS. 1 and 2 are block diagrams representation of a system for preparing a new store for opening and operation.

Referring to FIG. 1, a system 100 for preparing a new store for opening and operation includes a host computer 102 and a plurality of network elements 104, generally shown as network element #1 142, network element #2 144, network element #3 146, network element #4 148, network element #5 150, network element #6 152, network element #7 154, and network element #8 156. The host computer 102, for example, may be an IBM AS/400 computer. In particular, the host computer 102 includes a processor 172 and a storage device 174. The storage device 174 may be, but is not limited to, a hard disk, a floppy disk, a memory card, a memory stick, a compact disc, a digital versatile disc, a magnetic memory, a read only memory, an erasable programmable read only memory, a random access memory, a magnetic memory, and an optical memory. In an alternate embodiment, the computer 102 and the storage device 174 may be configured as multiple components rather than a single (e,g., integral or unitary) component. For example, the storage device 174 may be a separate database, which is operatively coupled to the processor 172 of the computer 102. The plurality of network elements 104 may be, but is not limited to, a network server, a computer associated with an existing store, a computer associated with a new store (e.g., an IBM AS/400 computer), a printer, and an access computer (e.g., a laptop).

A basic flow for preparing a new store for opening and operation that may be applied with the system 100 shown in FIG. 1 may start with the processor 172 generating a data structure within the storage device 174 of the host computer 102 to store information associated with each of a plurality of virtual stores which, in turn, corresponds to a new store. For example, the data structure may be, but is not limited to, a set of libraries and files configured to store information associated with opening and operation of the new store. The plurality of network elements 104 may provide the host computer 102 with data to generate information associated with the plurality of virtual stores based on information associated with at least one existing store. In particular, the information associated with at least one existing store may be information associated with, but is not limited to, inventory, item pricing, shelf price tag, sales prediction, vendor relationship, marketing relationship, and promotional order of an existing store.

One of the plurality of virtual stores corresponds with the new store, and the information associated with the plurality of virtual stores includes information associated with opening and operation of the new store. The information associated with the plurality of virtual stores is stored in a data structure within the storage device 174 as described above. Thus, the information associated with opening and operation of the new store may be information associated with, but is not limited to, inventory, item pricing, shelf price tag, sales prediction, vendor relationship, marketing relationship, and promotional order.

To prepare the new store for opening and operation more effectively, the information associated with opening and operation of the new store may be based on information associated with at least one representative, existing store (e.g., an existing store with a similar profile as that of the new store). That is, the host computer 102 may generate the information associated with opening and operation of the new store based on information associated with, but not limited to, a store geographically proximate to the new store and a store demographically proximate to the new store. For example, information associated with opening and operation of a new store located in an urban area may be based on information associated with existing stores also located in urban areas whereas information associated with opening and operation of a new store located in a rural area may be based on information associated with existing stores located in rural areas. In another example, information associated with opening and operation of a new store located proximate to a college campus may be based on information associated with existing stores also located proximate to other college campuses. Yet other examples may include information associated with existing store(s) located in, but not limited to, a residential area and a commercial area. Climate and terrain of the location of the new store may also be contributing factors to determine which existing store(s) that the new store should model after. Nonetheless, inventory of the new store may be "pre-tailored" to better fit the need and/or demand of the customers to be serviced by the new store. As a result, the new store may be stocked to avoid excess surpluses or shortages because lack of and/or inaccurate sales information.

To illustrate the concept for preparing a new store for opening and operation, the network element #1 142 such as a basic department management (BDM) server may provide the host computer 102 with configurations for generating the data structure to store information associated with a plurality of virtual stores as described above (i.e., a profile for each of the plurality of virtual stores). The network element #2 144 may provide the host computer with initial setup data to generate information associated with the plurality of virtual stores. The initial setup data may be information associated with, but not limited to, basic items to order, shelf capacity, and planogram subscription. In particular, a planogram subscription provides a diagram of shelves for placing items within the new store.

The network elements #3 and #4 146, 148 may be, for example, a server associated with all existing stores and a server associated with marketing to provide the host computer 102 with information associated with upcoming promotions and seasonal ordering such as ad bulletins and group sheets forecasts for existing stores. The ad bulletins may include orders for promotions within a short upcoming period (e.g., within two weeks). The group sheets forecasts may include seasonal orders such as orders for holidays. For example, the information may include price and cost for a seasonal order. As a result, the information associated with the plurality of virtual stores may include information associated with upcoming promotions and seasonal ordering as if the plurality of virtual stores were opened and operating as existing stores. In an alternate embodiment, the network elements #3 and #4 146, 148 may be configured as a single (i.e., integral or unitary) component rather than multiple components (e.g., a central server).

The network element #5 150 may be, but is not limited to, an access computer so that personnel from different departments may able to access information associated with the plurality of virtual stores within the storage device 174 of the host computer 102. For example, the network element #5 150 may be a laptop or a desktop computer used to update the information associated with the plurality of virtual stores with pricing information, and upcoming seasonal and/or promotional information. To illustrate this concept, one of the plurality of virtual stores corresponds to a new store, and a computer associated with a new store may be downloaded with information associated with the one of the plurality of virtual stores from the host computer 102 at a new store staging facility. After leaving the new store staging facility and during transit to the location of the new store, the computer associated with the new store may not be directly updated with new information such as upcoming seasonal and/or promotional information. Thus, the network element #5 150 may be used to update information associated with the one of the plurality of virtual stores, which corresponds to the new store, while the computer associated with the new store is in transit to the location of the new store. After arriving at the location of the new store, the computer associated with the new store may be synchronized with the updated information associated with the one of the plurality of store as described in detail below. As a result, the computer associated with the new store may be updated with the new information.

The network element #6 152 may be, but is not limited to, a computer associated with an existing store (e.g., Existing Store #1). To relieve excess inventory within the existing store and to help stock the new store, the information associated with opening and operation of the new store may be based on information associated with a transfer of inventory from the existing store. For example, the existing store may contribute its excess inventory to the opening order of inventory by the new store. As a result, the business balances stock between stores and avoids ordering more of the same product by transferring excess inventory from an existing store to the new store.

As noted above, the host computer 102 generates information associated with opening and operation of the new store based on information associated with at least one representative, existing store to avoid a surplus or shortage of items. That is, the host computer 102 may generate the information associated with opening and operation of the new store based on, but not limited to, a store geographically proximate to the new store and a store demographically proximate to the new store. To illustrate this concept, the host computer 102 is operatively coupled to the network element #7 154, which may be, but is not limited to, a computer associated with the existing store described above (i.e., network element #6 and network element #7 may be the same computer) and a computer associated with another existing store (e.g., a computer associated with Existing Store #2). The network element #7 154 provides the host computer 102 with information associated with sales of an existing store to model the type of sales to expect at the new store. For example, the potential sales at the new store 200 within a predetermined percentage of the sales in a quarter (e.g., last four months) of the Existing Store #2. As a result, the new store may be stocked with inventory entirely the same as at least one representative, existing store or a percentage similar to at least one representative, existing store.

Accordingly, opening orders of inventory for the new store 200 may be made based on the information associated with opening and operation of the new store 200. That is, the host computer 102 transmits the opening orders for the new store 200 to the network element #8 156, which may be a computer associated with a distribution center (e.g., a warehouse).

The network element #9 158 may be, for example, a peripheral such as a printer operable to generate mass volume of store signs and shelf price tags for the new stores to avoid backlogs at the new store printers. The network element #8 may be disposed at, but not limited to, the new store staging facility 180 as shown in FIG. 1. In an alternate embodiment, the network element #9 158 may be disposed at the new store 200.

Figure 2:
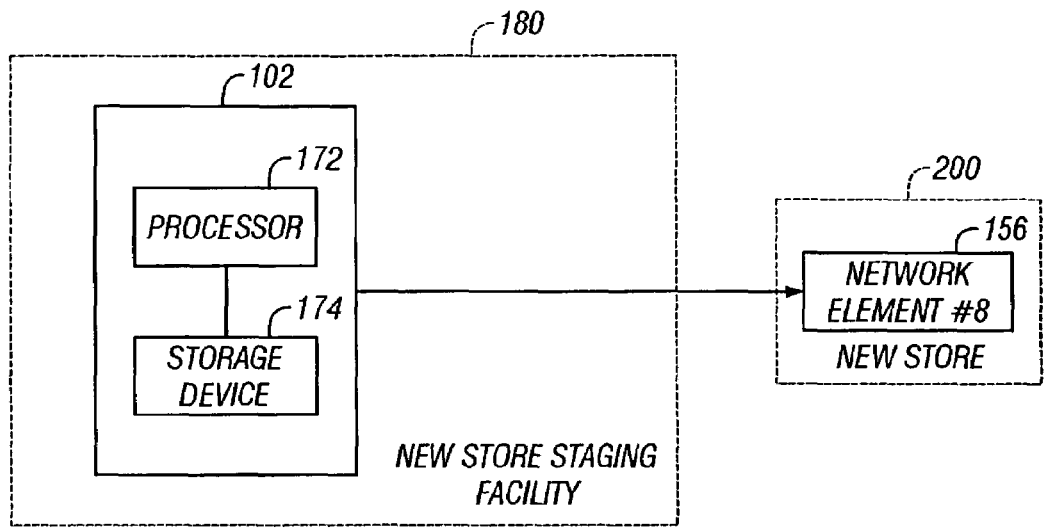

The network element #10 160 may be a computer associated with the new store (i.e., new store computer). Prior to leaving the new store staging facility 180, the new store computer 150 may be provided with information associated with opening and operation of the new store by the host computer 102 (i.e., an initial download). As mentioned above, the new store computer 150 may be updated and/or synchronized with information generated by the host computer 102 during the transit of the new store computer 150 to the new store 200 (i.e., updated download). After arriving at the new store 200 as shown in FIG. 2, for example, the new store computer 150 may be synchronized with the host computer 102.

In an alternate embodiment, the new store computer 150 may be delivered to the new store 200 without the initial download. As a result, the host computer 102 may provide the new store computer 150 with information associated with the new store after the new store computer 150 is delivered to the location of the new store 200.

It will be appreciated by a person of ordinary skill in the art that in alternate embodiments, the number and the type of network elements operatively coupled to the host computer 102 may vary. In particular, the system 100 may include additional network elements associated with different departments of other existing stores so that the information associated with opening and operation of a new store may include information associated with each department within the new store. For example, the new store may include a pharmacy section, a grocery section, and an apparel section. The pharmacy section of Existing Store #1 is more representative of the pharmacy section of the new store whereas the grocery section of Existing Store #2 and the apparel section of Existing Store #3 are more representative of the grocery section and the apparel section of the new store, respectively. Thus, the host computer 102 may use information from all three existing stores to generate a more accurate profile of the inventory for the new store.

Figure 3:
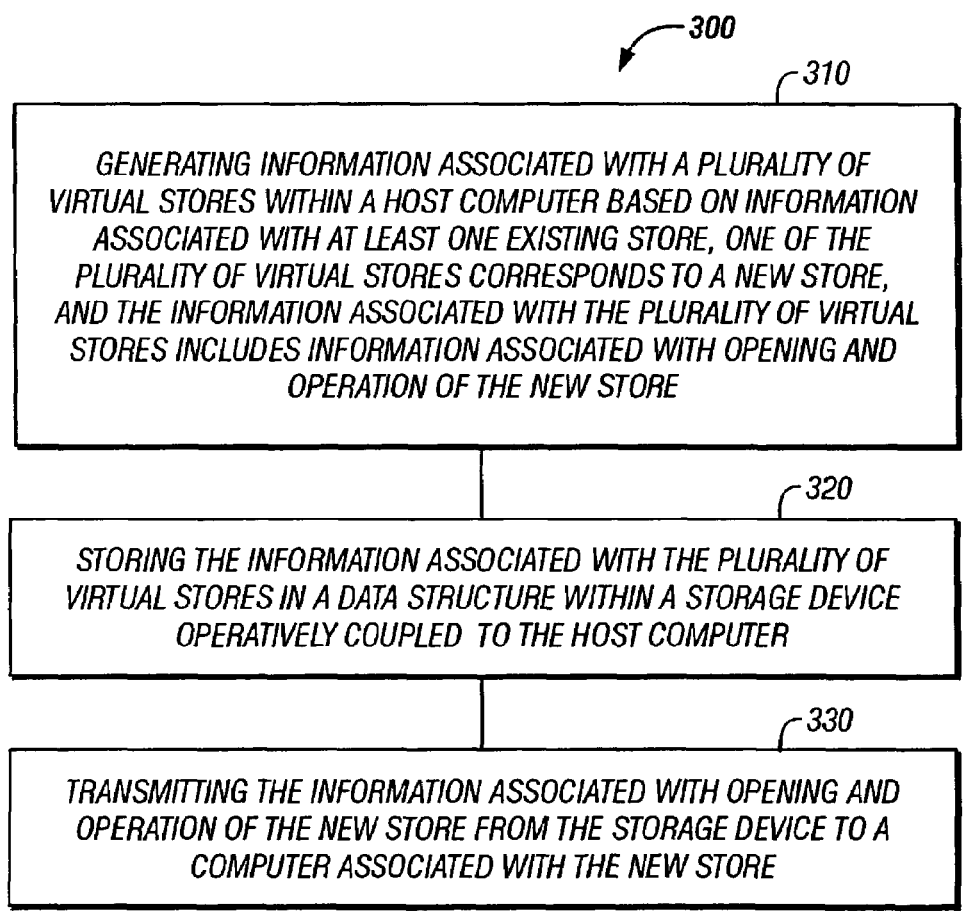
FIG. 3 is a flow diagram illustrating a method for preparing a new store for opening and operation.

With reference to FIG. 3, a method for preparing a new store for opening and operation is shown. Method 300 begins at step 310, where a host computer generates information associated with a plurality of virtual stores based on information associated with at least one existing store. For example, the host computer may generate information associated with such as opening inventory, item pricing, shelf price tag, sales prediction, vendor relationship, marketing relationship, and promotional order based on information associated with a representative, existing store. The existing store may be a store with a representative profile of the new store such as, but not limited to, a store being geographically proximate to the new store and a store being demographically proximate to the new store. Next, at step 320, the host computer stores the information associated with the plurality of virtual stores in a data structure within a storage device. That is, the storage device includes a profile for each of the plurality of virtual stores. One of the plurality of virtual stores corresponds to a new store so that the information associated with the plurality of virtual stores includes information associated with opening and operation of the new store. The host computer at step 330 transmits the information associated with opening and operation of the new store from the storage device to a computer associated with the new store. As a result, the computer associated with the new store includes information associated with opening and operation of the new store so that the new store may be prepared for opening and operation.

Many changes and modifications could be made to the invention without departing from the fair scope and spirit thereof. The scope of some changes is discussed above. The scope of others will become apparent from the appended claims.

What is claimed is:

1. A method for preparing a new physical retail store for opening and operation, the method comprising:

receiving, at a host computer, data from a plurality of network elements, the plurality of network elements including a basic department management server, a central server associated with existing stores, a computer associated with a distribution center, an access computer, at least one existing computer associated with at least one existing physical retail store, and a printer, wherein the received data includes:

initial setup data received from the basic department management server, the initial setup data including information associated with initial items to order, shelf capacity, and a planogram subscription, a first set of information (1) received from the central server, and (2) associated with upcoming promotions, seasonal ordering, ad bulletins, and group sheets forecasts for the existing stores, a second set of information (1) received from the at least one existing computer associated with the at least one existing physical retail store, and (2) associated with a transfer of inventory between the at least one existing physical retail store and the new physical retail store, and a third set of information (1) received from the at least one existing computer associated with the at least one existing physical retail store, and (2) associated with sales of the at least one existing physical retail store;

based in the received data, automatically generating within the host computer a fourth set of information associated with (1) a plurality of virtual stores, one of which corresponds to the new physical retail store, and (2) the opening and operation of the new physical retail store, wherein the step of automatically generating the fourth set of information includes using the third set of information to automatically generate a model of expected sales of the new physical retail store, wherein the model of expected sales of the new physical retail store is within a predetermined percentage of information associated with the sales of the at least one existing physical retail store;

storing the fourth set of information in a data structure within a storage device operatively coupled to the host computer, the storage device accessible by the access computer;

determining when a computer associated with the new physical retail store has not arrived at the new physical retail store, is physically in transit, or is otherwise unavailable;

when it is determined that the computer associated with the new physical store has not arrived at the new physical retail store, is physically in transit, or is otherwise unavailable:

updating the fourth set of information within the storage device with any new information associated with the opening and operation of the new physical retail store, the any new information received at the host computer, and when the computer associated with the new physical retail store arrives at the new physical retail store and is available, transmitting to the computer associated with the new physical retail store the updated fourth set of information retrieved from the storage device via the access computer;

based on the updated fourth set of information, generating an opening order for the new physical retail store; and transmitting the opening order for the new physical retail store to the computer associated with the distribution center, wherein the opening order is pre-tailored, thereby better fitting a need or a demand of customers to be serviced by the new physical retail store.

2. The method of claim 1, wherein the step of automatically generating, within the host computer, the fourth set of information comprises automatically generating information associated with inventory, opening item pricing, shelf price tag, sales prediction, vendor relationship, marketing relationship, and promotional order.

3. The method of claim 1, wherein the step of automatically generating, within the host computer, the fourth set of information comprises automatically generating the fourth set of information based on a fifth set of information associated with at least one representative, existing physical retail store, wherein the at least one representative, existing physical retail store is geographically proximate to the new physical retail store.

4. The method of claim 1, wherein receiving, at the host computer, data from the central server associated with the existing stores comprises receiving, at the host computer, data from the central server associated with the existing stores and a marketing server.

5. The method of claim 1, wherein the step of storing the fourth set of information in the data structure within the storage device comprises storing the fourth set of information in the data structure within one of a hard disk, a floppy disk, a memory card, a memory stick, a compact disc, a digital versatile disc, a magnetic memory, a read only memory, an erasable programmable read only memory, a random access memory, a magnetic memory, or an optical memory.

6. A system for preparing a new physical retail store for opening and operation, comprising:

means for receiving, at a host computer, data from a plurality of network elements, the plurality of network elements including a basic department manager server, a central server associated with existing stores, a computer associated with a distribution center, an access computer, at least one existing computer associated with at least one existing physical retail store, and a printer, wherein the received data includes:

initial setup data received from the basic department management server, the initial setup data including information associated with initial items to order, shelf capacity, and a planogram subscription, a first set of information (1) received from the central server, and (2) associated with upcoming promotions, seasonal ordering, ad bulletins, and group sheets forecasts for the existing stores, a second set of information (1) received from the at least one existing computer associated with the at least one existing physical retail store, and (2) associated with a transfer of inventory between the at least one existing physical retail store and the new physical retail store, and a third set of information (1) received from the at least one existing computer associated with the at least one existing physical retail store, and (2) associated with sales of the at least one existing physical retail store;

means for automatically generating, within the host computer using the received data, a fourth set of information associated with (1) a plurality of virtual stores, one of which corresponds to the new physical retail store, and (2) the opening and operation of the new physical retail store, wherein the step of automatically generating the fourth set of information further includes using the third set of information to automatically generate a model of expected sales of the new physical retail store, and wherein the model of expected sales of the new physical retail store is within a predetermined percentage of information associated with the sales of the at least one existing physical retail store;

means for storing the fourth set of information in a data structure within a storage device operatively coupled to the host computer, the storage device accessible by the access computer; and means for synchronizing, with the host computer, the fourth set of information at a computer associated with the new physical retail store when the computer associated with the new physical retail store arrives at the location of the new physical retail store.

7. A system for preparing a new physical retail store for opening and operation comprising:

a plurality of network elements, including a basic department management server, a central server associated with existing stores, a computer associated with a distribution center, an access computer, at least one existing computer associated with at least one existing physical retail store, and a printer;

a host computer operatively coupled to the plurality of network elements, the host computer being operable to:

receive data from the plurality of network elements, the received data including:

initial setup data received from the basic department management server, the initial setup data including information associated with initial items to order, shelf capacity, and a planogram subscription, a first set of information (1) received from the central server, and (2) associated with upcoming promotions, seasonal ordering, ad bulletins, and group sheets forecasts for the existing stores, a second set of information (1) received from the at least one existing computer associated with the at least one existing physical retail store, and (2) associated with a transfer of inventory between the at least one existing physical retail store and the new physical retail store, and a third set of information (1) received from the at least one existing computer associated with the at least one existing physical retail store, and (2) associated with sales of the at least one existing physical retail store; and based on the received data, automatically generate a fourth set of information associated with (1) a plurality of virtual stores, one of which corresponds to the new physical retail store, and (2) the opening and operation of the new physical retail store, wherein the fourth set of information includes a model of expected sales of the new physical retail store, wherein the model of expected sales of the new physical retail store is within a predetermined percentage of information associated with the sales of the at least one existing physical retail store; and a storage device operatively coupled to the host computer and accessible by the access computer, the storage device is enabled to store the fourth set of information in a data structure, wherein when a computer associated with the new physical store has not arrived at the new physical retail store, is physically in transit, or is otherwise unavailable:

the fourth set of information is stored in the data structure within the storage device and is updated with any new information associated with the opening and operation of the new physical retail store, the any new information received at the host computer, and when the computer associated with the new physical retail store arrives at the new physical retail store and is available, the access computer retrieves the updated fourth set of information from the storage device and transmits the updated fourth set of information to the computer associated with the new physical retail store; and wherein the host computer is further operable to generate an opening order for the new physical retail store based on the updated fourth set of information and to transmit the opening order to the computer associated with the distribution center, wherein the opening order is pre-tailored, thereby better fitting a need or a demand of customers to be serviced by the new physical retail store.

8. The system of claim 7, wherein one of the plurality of network elements is the computer associated with the new physical retail store, and the computer associated with the new physical retail store is operable to receive, from the host computer, the fourth set of information.

9. The system of claim 7, wherein the received data further includes a fifth set of information received from at least one existing computer associated with at least one representative, existing physical retail store, and wherein the at least one representative, existing physical retail store is demographically and geographically proximate to the new physical retail store.

10. The system of claim 7, wherein the received data further includes a fifth set of information corresponding to the at least one existing physical retail store, including: inventory, item pricing, shelf price tag, sales prediction, vendor relationship, marketing relationship, and promotional order.

11. The system of claim 7:

wherein the initial setup data received from the basic department management server further includes a configuration for generating the data structure, and wherein the data structure is configured to store the fourth set of information using the initial data setup.

12. The system of claim 7, wherein the storage device comprises one of a hard disk, a floppy disk, a memory card, a memory stick, a compact disc, a digital versatile disc, a magnetic memory, a read only memory, an erasable programmable read only memory, a random access memory, a magnetic memory, or an optical memory.

13. The system of claim 7, wherein the fourth set of information is based on a fifth set of information received from the central server associated with the existing stores, the information received from the central server associated with the existing stores including a pricing and a cost of a seasonal order of the existing stores.

14. In a new physical retail store staging system, a computer program comprising a plurality of routines embodied on a computer-readable storage medium for preparing a new physical retail store for opening and operation, the computer program comprising:

a first routine that directs a processor to receive data from a plurality of network elements, the plurality of network elements including a basic department management server, a central server associated with existing stores, a computer associated with a distribution center, an access computer, at least one existing computer associated with at least one existing physical retail store, and a printer, wherein the received data includes:

initial setup data received from the basic department management server, the initial setup data including information associated with initial items to order, shelf capacity, and a planogram subscription, a first set of information (1) received from the central server, and (2) associated with upcoming promotions, seasonal ordering, ad bulletins, and group sheets forecasts for the existing stores, a second set of information (1) received from the at least one existing computer associated with the at least one existing physical retail store, and (2) associated with a transfer of inventory between the at least one existing physical retail store and the new physical retail store, and a third set of information (1) received from the at least one existing computer associated with the at least one existing physical retail store, and (2) associated with sales of the at least one existing physical retail store;

a second routine that directs the processor to automatically generate, based on the received data, a fourth set of information associated with (1) a plurality of virtual stores, one of which corresponds to the new physical retail store, and (2) the opening and operation of the new physical retail store, wherein the fourth set of information includes a model of expected sales of the new physical retail store, and wherein the model of expected sales of the new physical retail store is within a predetermined percentage of information associated with the sales of the at least one existing physical retail store;

a third routine that directs the processor to store the fourth set of information in a data structure within the computer-readable storage medium;

a fourth routine that directs the processor to determine when a computer associated with the new physical store has not arrived at the new physical retail store, is physically in transit, or is otherwise unavailable, wherein:

when the fourth routine determines that the computer associated with the new physical store has not arrived at the new physical retail store, is physically in transit, or is otherwise unavailable:

the fourth routine updates the fourth set of information with any new information associated with the opening and operation of the new physical retail store, the any new information received from the plurality of network elements, and when the computer associated with the new physical retail store arrives at the new physical retail store and is available, the fourth routine transmits the updated fourth set of information to the computer associated with the new physical retail store;

a fifth routine that directs the processor to generate an opening order for the new physical retail store based on the updated fourth set of information; and a sixth routine that directs the processor to transmit the opening order to the computer associated with the distribution center, wherein the opening order is pre-tailored, thereby better fitting a need or a demand of customers to be serviced by the new physical retail store.

15. The computer program of claim 14, wherein the second routine directs the processor to automatically generate the fourth set of information to further include opening inventory, item pricing, shelf price tag, sales prediction, vendor relationship, marketing relationship, and promotional order based on a fifth set of information associated with the at least one existing physical retail store.

16. The computer program of claim 14, wherein the second routine further directs to the processor to automatically generate the fourth set of information based on a fifth set of information associated with at least one representative, existing physical retail store, wherein the at least one representative, existing physical retail store includes one of a store being geographically proximate to the new physical retail store or a store being demographically proximate to the new physical retail store.

17. The computer program of claim 14, wherein the third routine directs to the processor to store the fourth set of information in the data structure within one of a hard disk, a floppy disk, a memory card, a memory stick, a compact disc, a digital versatile disc, a magnetic memory, a read only memory, an erasable programmable read only memory, a random access memory, a magnetic memory, or an optical memory.

18. A host computer for providing information associated with opening and operation of a new physical retail store, the host computer comprising:

a processor being operable to:

receive data from a plurality of network elements, the plurality of network elements including a basic department management server, a central server associated with existing stores, a computer associated with a distribution center, an access computer, at least one existing computer associated with at least one existing physical retail store, and a printer, wherein the received data includes:

initial setup data received from the basic department management server, the initial setup data including information associated with initial items to order, shelf capacity, and a planogram subscription, a first set of information (1) received from the central server, and (2) associated with upcoming promotions, seasonal ordering, ad bulletins, and group sheets forecasts for the existing stores, a second set of information (1) received from the at least one existing computer associated with the at least one existing physical retail store, and (2) associated with a transfer of inventory between the at least one existing physical retail store and the new physical retail store, and a third set of information (1) received from the at least one existing computer associated with the at least one existing physical retail store, and (2) associated with sales of the at least one existing physical retail store;

based on the received data, automatically generate a fourth set of information associated with (1) a plurality of virtual stores, one of which corresponds to the new physical retail store, and (2) the opening and operation of the new physical retail store, wherein the fourth set of information includes a model of expected sales of the new physical retail store, and wherein the model of expected sales of the new physical retail store is within a predetermined percentage of information associated with the sales of the at least one existing physical retail store;

store the fourth set of information in a data structure;

determine when a computer associated with the new physical store has not arrived at the new physical retail store, is physically in transit, or is otherwise unavailable, wherein:

when the computer associated with the new physical store has not arrived at the new physical retail store, is physically in transit, or is otherwise unavailable:

update the fourth set of information with any new information associated with the opening and operation of the new physical retail store, the any new information received from the plurality of network elements, and when the computer associated with the new physical retail store arrives at the new physical retail store and is available, transmit the updated fourth set of information to the computer associated with the new physical retail store;

generate an opening order for the new physical retail store based on the updated fourth set of information; and transmit the opening order to the computer associated with the distribution center, wherein the opening order is pre-tailored, thereby better fitting a need or a demand of customers to be serviced by the new physical retail store; and a memory including the data structure, wherein the processor is operatively coupled to the memory.

19. The host computer of claim 18, wherein the fourth set of information is based on a fifth set of information associated with at least one representative, existing physical retail store, wherein the at least one representative, existing physical retail store includes at least one of a store being geographically proximate to the new physical retail store or a store being demographically proximate to the new physical retail store.

20. The host computer of claim 18, wherein the received data further comprises a fifth set of information associated with inventory, item pricing, shelf price tag, sales prediction, vendor relationship, marketing relationship, and promotional order of the at least one existing physical retail store.

21. The host computer of claim 18, wherein the memory comprises one of a hard disk, a floppy disk, a memory card, a memory stick, a compact disc, a digital versatile disc, a magnetic memory, a read only memory, an erasable programmable read only memory, a random access memory, a magnetic memory, or an optical memory.

* * * * *